(12) United States Patent
Han et al.

(10) Patent No.: US 11,088,643 B1
(45) Date of Patent: Aug. 10, 2021

(54) DEMAGNETIZATION SENSING FOR PERMANENT MAGNET SYNCHRONOUS MOTOR DRIVE

(71) Applicant: Infineon Technologies Austria AG, Villach (AT)

(72) Inventors: Lei Han, Los Angeles, CA (US); Toshio Takahashi, Rancho Palos Verdes, CA (US)

(73) Assignee: Infineon Technologies Austria AG

( * ) Notice: Subject to any disclaimer, the term of this patent is extended or adjusted under 35 U.S.C. 154(b) by 0 days.

(21) Appl. No.: 16/807,817

(22) Filed: Mar. 3, 2020

(51) Int. Cl.
| H02P 21/16 | (2016.01) |
| H02P 21/10 | (2016.01) |
| H02P 21/22 | (2016.01) |
| H02P 21/18 | (2016.01) |
| H02P 21/14 | (2016.01) |

(52) U.S. Cl.
CPC .............. *H02P 21/16* (2016.02); *H02P 21/10* (2013.01); *H02P 21/141* (2013.01); *H02P 21/18* (2016.02); *H02P 21/22* (2016.02)

(58) Field of Classification Search
CPC ...................................................... H02P 21/16
See application file for complete search history.

(56) References Cited

U.S. PATENT DOCUMENTS

| 4,427,934 A * | 1/1984 | Tupper .................. H02P 25/024 318/723 |
| 5,783,916 A * | 7/1998 | Blackburn ............ H02P 25/089 318/254.2 |
| 6,462,491 B1 * | 10/2002 | Iijima ...................... H02P 9/18 318/400.09 |
| 7,076,340 B1 * | 7/2006 | Inazumi .................. H02P 21/04 318/700 |

(Continued)

OTHER PUBLICATIONS

He, Jing, et al., "Demagnetization Fault Detection in Permanent Magnet Synchronous Motors Based on Sliding Observer". Journal of Nonlinear Science and Applications, (2016), vol. 9, Issue 5, pp. 2039-2048, [Online] URL: <https://www.isr-publications.com/jnsa/articles-2227-demagnetization-fault-detection-in-permanent-magnet-synchronous-motors-based-on-sliding-observer>.

(Continued)

*Primary Examiner* — Bentsu Ro
(74) *Attorney, Agent, or Firm* — Design IP

(57) ABSTRACT

A motor controller includes a current controller configured to generate control signals for driving a motor, where the current controller is configured to measure voltage information of the motor and current information of the motor; a flux estimator configured to calculate a rotor magnetic flux linkage based on the voltage and current information; an extraction circuit configured to extract a flux linkage magnitude of the rotor magnetic flux linkage from the received rotor magnetic flux linkage; and a demagnetization detector configured to continuously monitor for a demagnetization of (Continued)

a rotor permanent magnet of the motor during operation of the motor based on the flux linkage magnitude, where the demagnetization detector is configured to compare the flux linkage magnitude to a predefined demagnetization level and detect the demagnetization on a condition that the flux linkage magnitude is equal to or less than the predefined demagnetization level.

21 Claims, 4 Drawing Sheets

(56) References Cited

U.S. PATENT DOCUMENTS

| | | | | |
|---|---|---|---|---|
| 2002/0060546 A1* | 5/2002 | Veltman | ............... | H02P 6/006 |
| | | | | 318/700 |
| 2003/0030404 A1* | 2/2003 | Iwaji | ............... | H02P 6/18 |
| | | | | 318/700 |
| 2007/0069681 A1* | 3/2007 | Imura | ............... | H02P 6/182 |
| | | | | 318/717 |

OTHER PUBLICATIONS

Akar, Mehmet, et al., "Demagnetization Fault Diagnosis in Permanent Magnet Synchronous Motors". Przegląd Elektrotechniczny, ISSN 0033-2097, R. 89 NR 2a/2013, Gaziosmanpasa University (1,2), [Online] URL: <http://pe.org.pl/articles/2013/2a/49.pdf>.

Hong, Jongman, et al., "Detection and Classification of Rotor Demagnetization and Eccentricity Faults for PM Synchronous Motors". IEEE Transactions on Industry Applications, (Mar. 19, 2012), vol. 48, Issue 3, pp. 923-932, [Online] URL: <https://ieeexplore.ieee.org/abstract/document/6171844>.

Ruiz, Jordi-Roger Riba, et al., "Detection of Demagnetization Faults in Permanent-Magnet Synchronous Motors Under Nonstationary Conditions". IEEE Transactions on Magnetics, (Jul. 2009), vol. 45, Issue 7, pp. 2961-2969, [Online] URL: <https://ieeexplore.ieee.org/document/5089909>.

Infineon Technologies AG, "iMOTION™ Motion Control Engine", Software Reference Manual, (Jun. 5, 2019), vol. 1.2, pp. 1-152, [Online] URL: <https://www.infineon.com/dgdl/Infineon-MCESW-RM-UserManual-v01_02-EN.pdf?fileId=5546d4626b2d8e69016b7bfb7c04786d>.

Sjökvist, Stefan, et al., "Investigation of Permanent Magnet Demagnetization in Synchronous Machines during Multiple Short-Circuit Fault Conditions". MDPI—Journals, Energies, (Oct. 18, 2017), vol. 10, No. 10, Article No. 1638,pp. 1-12, [Online] URL: <https://www.mdpi.com/1996-1073/10/10/1638>.

Gao, Caixia, et al., "Mode Recognition and Fault Positioning of Permanent Magnet Demagnetization for PMSM". MDPI—Journals, Energies, (Apr. 30, 2019), vol. 12, No. 9, Article No. 1644, pp. 1-14, [Online] URL: <https://www.mdpi.com/1996-1073/12/9/1644/htm>.

* cited by examiner

DEMAGNETIZATION SENSING FOR PERMANENT MAGNET SYNCHRONOUS MOTOR DRIVE

FIELD

The present disclosure relates generally to devices and to methods for monitoring the permanent magnetic flux linkage of a permanent magnet synchronous motor (PMSM).

BACKGROUND

Permanent Magnet Synchronous Motors (PMSMs) are becoming more widely used in home appliance applications due to their high energy efficiency and reliable operation. Motor control algorithms are used by a motor controller for controlling a PMSM. However, one of the challenges that PMSM type motors face is the risk of demagnetization of the permanent magnetic materials used in the rotor. The causes of demagnetization of the permanent magnet include excessive alternating current (AC) applied in stators, excessive field-weakening control, elevated temperature, and vibration. Demagnetization of the permanent magnet may result in reduced torque per ampere capability, degradation of motor operating efficiency, overheating, and even complete motor system failure.

Therefore, it may be desirable to develop a method for continuously monitoring the permanent magnetic flux linkage throughout the entire lifetime duration of a PMSM drive system, and to detect the occurrence of demagnetization of the permanent magnet.

SUMMARY

One or more embodiments provide a motor controller configured to drive a permanent magnet synchronous motor (PMSM). The motor controller includes a current controller configured to generate control signals for driving the PMSM, where the current controller is configured to measure voltage information of the PMSM and current information of the PMSM; a flux estimator configured to receive the voltage information and the current information and calculate a rotor magnetic flux linkage based on the voltage information and the current information; an extraction circuit configured to receive the rotor magnetic flux linkage and extract a flux linkage magnitude of the rotor magnetic flux linkage from the received rotor magnetic flux linkage; and a demagnetization detector configured to continuously monitor for a demagnetization of a rotor permanent magnet of the PMSM during operation of the PMSM based on the flux linkage magnitude, wherein the demagnetization detector is configured to compare the flux linkage magnitude to a predefined demagnetization level and detect the demagnetization on a first condition that the flux linkage magnitude is equal to or less than the predefined demagnetization level.

One or more embodiments provide a method of monitoring for a demagnetization of a rotor permanent magnet of a permanent magnet synchronous motor (PMSM) during operation of the PMSM. The method includes generating, by a current controller, control signals for driving the PMSM; measuring, by the current controller, voltage information of the PMSM and current information of the PMSM; calculating, by a flux estimator, a rotor magnetic flux linkage based on the voltage information and the current information; extracting, by an extraction circuit, a flux linkage magnitude of the rotor magnetic flux linkage from the rotor magnetic flux linkage; and continuously monitoring for the demagnetization, by a demagnetization detector, based on the flux linkage magnitude, wherein continuously monitoring includes comparing the flux linkage magnitude to a predefined demagnetization level and detecting the demagnetization on a first condition that the flux linkage magnitude is equal to or less than the predefined demagnetization level.

BRIEF DESCRIPTION OF THE DRAWINGS

Embodiments are described herein making reference to the appended drawings.

DETAILED DESCRIPTION

Figure 1A:
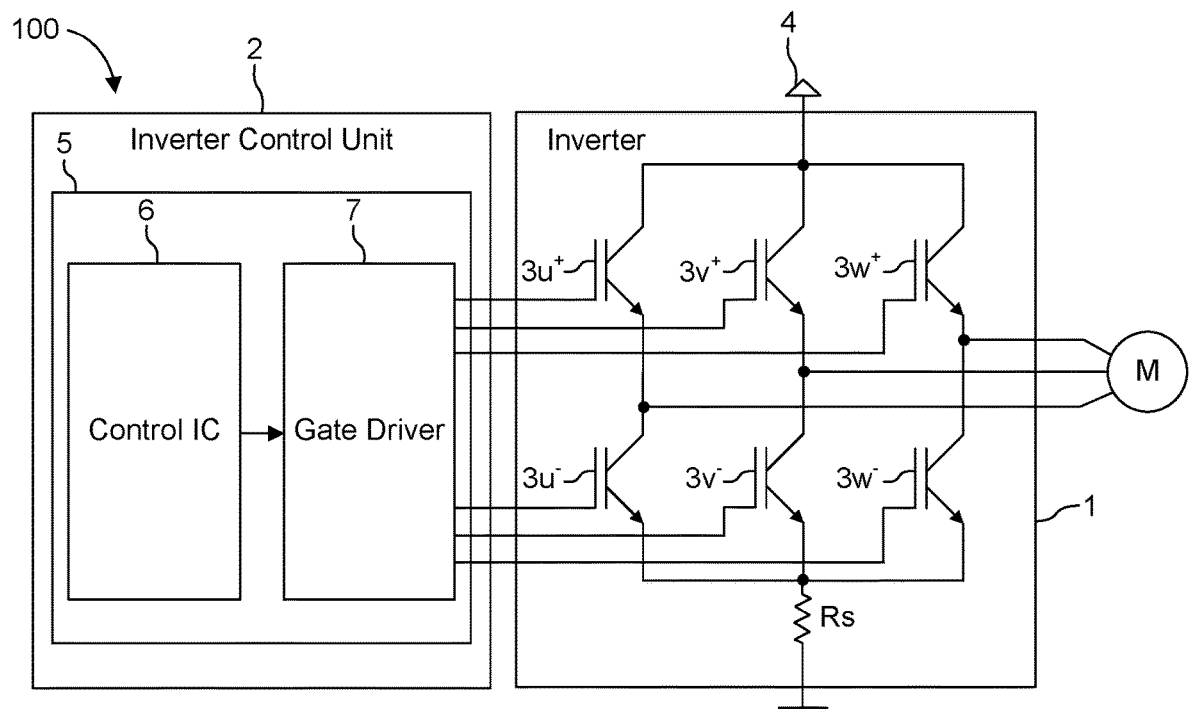
FIG. 1A is a schematic block diagram illustrating a motor control actuator of a power semiconductor device according to one or more embodiments.

In the following, details are set forth to provide a more thorough explanation of the exemplary embodiments. However, it will be apparent to those skilled in the art that embodiments may be practiced without these specific details. In other instances, well-known structures and devices are shown in block diagram form or in a schematic view rather than in detail in order to avoid obscuring the embodiments. In addition, features of the different embodiments described hereinafter may be combined with each other, unless specifically noted otherwise.

Further, equivalent or like elements or elements with equivalent or like functionality are denoted in the following description with equivalent or like reference numerals. As the same or functionally equivalent elements are given the same reference numbers in the figures, a repeated description for elements provided with the same reference numbers may be omitted. Hence, descriptions provided for elements having the same or like reference numbers are mutually exchangeable.

In this regard, directional terminology, such as "top", "bottom", "below", "above", "front", "behind", "back", "leading", "trailing", etc., may be used with reference to the orientation of the figures being described. Because parts of embodiments can be positioned in a number of different orientations, the directional terminology is used for purposes of illustration and is in no way limiting. It is to be understood that other embodiments may be utilized and structural or logical changes may be made without departing from the scope defined by the claims. The following detailed description, therefore, is not to be taken in a limiting sense.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

In embodiments described herein or shown in the drawings, any direct electrical connection or coupling, i.e., any connection or coupling without additional intervening elements, may also be implemented by an indirect connection or coupling, i.e., a connection or coupling with one or more additional intervening elements, or vice versa, as long as the general purpose of the connection or coupling, for example, to transmit a certain kind of signal or to transmit a certain kind of information, is essentially maintained. Features from different embodiments may be combined to form further embodiments. For example, variations or modifications described with respect to one of the embodiments may also be applicable to other embodiments unless noted to the contrary.

The term "substantially" may be used herein to account for small manufacturing tolerances (e.g., within 5%) that are deemed acceptable in the industry without departing from the aspects of the embodiments described herein.

A sensor may refer to a component which converts a physical quantity to be measured to an electric signal, for example, a current signal or a voltage signal. The physical quantity may, for example, be a current or a voltage at a shunt resistor in a single-shunt resistor system.

A signal processing circuit and/or a signal conditioning circuit may receive one or more signals from one or more components and perform signal conditioning or processing thereon. Signal conditioning, as used herein, refers to manipulating a signal in such a way that the signal meets the requirements of a next stage for further processing. Signal conditioning may include converting from analog to digital (e.g., via an analog-to-digital converter), amplification, filtering, converting, biasing, range matching, isolation and any other processes required to make a signal suitable for processing after conditioning.

Thus, a signal processing circuit may include an analog-to-digital converter (ADC) that converts the analog signal from the one or more sensor elements to a digital signal. The signal processing circuit may also include a digital signal processor (DSP) that performs some processing on the digital signal.

Many functions of modern devices in automotive, consumer and industrial applications, such as converting electrical energy and driving an electric motor or an electric machine, rely on power semiconductor devices. For example, Insulated Gate Bipolar Transistors (IGBTs), Metal Oxide Semiconductor Field Effect Transistors (MOSFETs) and diodes, to name a few, have been used for various applications including, but not limited to switches in power supplies and power converters.

A power semiconductor device usually comprises a semiconductor structure configured to conduct a load current along a load current path between two load terminal structures of the device. Further, the load current path may be controlled by means of a control electrode, sometimes referred to as gate electrode. For example, upon receiving a corresponding control signal from, e.g., a driver unit, the control electrode may set the power semiconductor device in one of a conducting state and a blocking state. A control signal may by a voltage signal or a current signal having a controlled value.

A power transistor is a power semiconductor device that may be used to drive a load current. For example, an IGBT is turned "ON" or "OFF" by activating and deactivating its gate terminal. Applying a positive input voltage signal across the gate and the emitter will keep the device in its "ON" state, while making the input gate signal zero or slightly negative will cause it to turn "OFF". There is a turn-on process and a turn-off process for switching the power transistor on and off. During the turn-on process, a gate driver integrated circuit (IC) may be used to provide (source) a gate current (i.e., an on current) to the gate of the power transistor in order to charge the gate to a sufficient voltage to turn on the device. In contrast, during the turn-off process, the gate driver IC is used to draw (sink) a gate current (i.e., an off current) from the gate of the power transistor in order to discharge the gate sufficiently to turn off the device. A current pulse may be output from the gate driver IC as the control signal according to a pulse width modulation (PWM) scheme. Thus, the control signal may be switched between an ON current level and an OFF current level during a PWM cycle for controlling a power transistor. This in turn charges and discharges the gate voltage to turn on and off the power transistor, respectively.

In particular, the gate of a power transistor is a capacitive load, and the turn ON current (i.e., gate source current) and the turn OFF current (i.e., gate sink current) are specified as the initial current when a switching event is initiated. During a turn OFF event, after some small amount of time (small compared to the PWM period), the gate current decreases and reaches a zero value when the gate reaches 0V. During a turn ON event, after some small amount of time (small compared to the PWM period), the gate current decreases and reaches a zero value when the gate reaches 15V.

Transistors may include Insulated Gate Bipolar Transistors (IGBTs) and Metal Oxide Semiconductor Field Effect Transistors (MOSFETs) (e.g., Si MOSFETs or SiC MOSFETs). While IGBTs may be used as an example in the embodiments below, it will be appreciated that MOSFETs may be substituted for the IGBTs and vice versa. In this context, when substituting a MOSFET for an IGBT, a MOSFET's drain may be substituted for an IGBT's collector, the MOSFET's source may be substituted for the IGBT's emitter, and the MOSFETs drain-source voltage VDS may be substituted for the IGBT's collector-emitter voltage $V_{CE}$ in any one of the examples described herein. Thus, any IGBT module may be substituted by a MOSFET module and vice versa.

Specific embodiments described in this specification pertain to, without being limited thereto, a power semiconductor device that may be used within a power converter or a power supply. Thus, in an embodiment, the power semiconductor device may be configured to carry a load current that is to be supplied to a load and/or, respectively, that is provided by a power source. For example, the semiconductor device may comprise one or more power semiconductor cells, such as a monolithically integrated diode cell, and/or a monolithically integrated transistor cell. Such diode cell and/or such transistor cells may be integrated in a power semiconductor module.

Power semiconductor devices that include transistors which are suitably connected to form half-bridges are commonly used in the field of power electronics. For example, half-bridges may be used for driving electric motors or switched mode power supplies.

For example, a multi-phase inverter is configured to provide multi-phase power by supplying multiple phase loads (e.g., a three-phase motor). For instance, three-phase power involves three symmetrical sine waves that are 120 electrical degrees out of phase with one another. In a symmetric three-phase power supply system, three conductors each carry an alternating current (AC) of the same frequency and voltage amplitude relative to a common reference but with a phase difference of one third the period. Due to the phase difference, the voltage on any conductor reaches its peak at one third of a cycle after one of the other conductors and one third of a cycle before the remaining conductor. This phase delay gives constant power transfer to a balanced linear load. It also makes it possible to produce a rotating magnetic field in an electric motor.

In a three-phase system feeding a balanced and linear load, the sum of the instantaneous currents of the three conductors is zero. In other words, the current in each conductor is equal in magnitude to the sum of the currents in the other two, but with the opposite sign. The return path for the current in any phase conductor is the other two phase conductors. The instantaneous currents result in a current space vector.

A three-phase inverter includes three inverter legs, one for each of the three phases, and each inverter leg is connected to a direct current (DC) voltage source in parallel to each other. Each inverter leg includes a pair of transistors, for example, arranged in a half-bridge configuration for converting DC to AC. In other words, each inverter leg includes two complementary transistors (i.e., a high-side transistor and a low-side transistor) connected in series and which switch on and off complementary to the each other for driving a phase load. However, multi-phase inverters are not limited to three phases, and may include two phases or more than three phases, with an inverter leg for each phase.

FIG. 1A is a schematic block diagram illustrating a motor control actuator 100 of a power semiconductor device according to one or more embodiments. In particular, the motor control actuator 100 includes a power inverter 1 and an inverter control unit 2. The inverter control unit 2 behaves as a motor control unit and thus may also be referred to as a motor controller or a motor control IC. The motor control unit may be a monolithic IC or may be split into a microcontroller and a gate driver on two or more ICs.

The motor control actuator 100 is further coupled to a three-phase motor M, that includes three phases U, V, and W. The power inverter 1 is a three-phase voltage generator configured to provide three-phase power by supplying three phase voltages to drive the motor M. It will be further appreciated that the power inverter 1 and the inverter control unit 2 may be placed on a same circuit board, or on separate circuit boards.

Deviations in both magnitude and phase may cause a loss in power and torque in the motor M. Therefore, the motor control actuator 100 may be configured to monitor and control the magnitude and phase of the voltages supplied to the motor M in real-time to ensure the proper current balance is maintained based on a feedback control loop. Open loop motor control units also exist and may be implemented.

The power inverter 1 for a three-phase motor M includes a switching array of six transistor modules 3u+, 3u−, 3v+, 3v−, 3w+, and 3w−(collectively referred to as transistor modules 3) arranged in complementary pairs. Each complementary pair constitutes one inverter leg that supplies a phase voltage to the three-phase motor M. Thus, each inverter leg includes an upper (high-side) transistor module 3 and a lower (low-side) transistor module 3. Each transistor module may include one power transistor and may also include a diode (not illustrated). Thus, each inverter leg includes an upper transistor and a lower transistor. Load current paths U, V, and W extend from an output of each inverter leg (i.e., the output of each half-bridge) located between complementary transistors and are configured to be coupled to a load, such as motor M. The power inverter 1 is coupled to a DC power supply 4 (e.g., a battery or a diode bridge rectifier) and to the inverter control unit 2.

In this example, the inverter control unit 2 includes a motor control circuit and the gate driver circuit for controlling the switching array. In some examples, the inverter control unit 2 may be monolithic in which the motor control circuit and gate driver circuit are integrated onto a single die. In other examples, the motor control circuit and gate driver circuit may be partitioned as separate ICs. A "monolithic" gate driver is a gate driver on a single silicon chip and may be further made with specific high voltage (HV) technology. Furthermore, the gate driver IC may be integrated on the power inverter 1.

The motor controller performs the motor control function of the motor control actuator 100 in real-time and transmits PWM control signals to a gate driver. Motor control function can include either controlling a permanent magnet motor or an induction motor and can be configured as a sensor-based control or a sensorless control not requiring the rotor position sensing, as is the case with a sensor based control with Hall sensors and/or an encoder device. Alternatively, the motor control function may include a combination of both sensor-based control (e.g., used at lower rotor speeds) and sensorless control (e.g., used at higher rotor speeds).

For example, the inverter control unit 2 includes a controller and driver unit 5 that includes a microcontroller unit (MCU) 6 as the motor controller and a gate driver 7 for generating driver signals for controlling the transistors of each transistor module 3. Thus, load current paths U, V, and W may be controlled by the controller and driver unit 5 by means of controlling the control electrodes (i.e., gate electrodes) of the transistors 3. For example, upon receiving a PWM control signal from the microcontroller, the gate driver IC may set a corresponding transistor in one of a conducting state (i.e., on-state) or a blocking state (i.e., off-state).

The gate driver IC may be configured to receive instructions, including the power transistor control signals, from the microcontroller, and turn on or turn off respective transistors 3 in accordance with the received instructions and control signals. For example, during the turn-on process of a respective transistor 3, the gate driver IC may be used to provide (source) a gate current to the gate of the respective transistor 3 in order to charge the gate. In contrast, during the turn-off process, the gate driver IC may be used to draw (sink) a gate current from the gate of the transistor 3 in order to discharge the gate.

The inverter control unit 2 or the controller and driver unit 5 itself may include a PWM controller, an ADC, a DSP, and/or a clock source (i.e., a timer or counter) used in implementing a PWM scheme for controlling the states of each transistor, and, ultimately, each phase current provided on the respective load current paths U, V, and W.

In particular, the microcontroller 6 of the controller and driver unit 5 may use a motor control algorithm, such as a Field Oriented Control (FOC) algorithm, for providing current control in real-time for each phase current output to a multi-phase load, such a multi-phase motor. Thus, the field-oriented control loop may be referred to as a current control loop. Motor speed may further be controlled by adding a speed constant control loop on top of FOC control that provides speed constant control. Thus, FOC (i.e., the current control loop) may be considered as an inner control loop and a speed constant control loop may be considered as an outer control loop. In addition, motor power, and consequently motor speed, may be further controlled by a power constant control loop on top of the speed constant control loop. Thus, the power constant control loop may be considered the outermost control loop, at least with respect to the current control loop and the speed constant control loop. In other words, the current control loop may be considered as an inner control loop, a speed constant control loop may be considered as an intermediate control loop, and a power constant control loop may be considered as an outer control loop.

The current control loop and the speed constant control loop always remain activated or enabled during motor control (i.e., during runtime of the motor). Likewise, it is possible that the power constant control loop remains activated or enabled during motor control. However, it is also possible that the power constant control loop be switchably activated/deactivated (enabled/disabled) during motor control. In instances when the power constant control loop is activated, the controller and driver unit 5 is considered to be in power constant control mode, even though the speed constant control loop is also activated. In instances when the power constant control loop is deactivated, the controller and driver unit 5 is considered to be in speed constant control mode.

In some cases, motor position may be controlled using a fourth control loop (e.g., a position control loop) that is also outside of the speed constant control loop.

For example, during FOC, a motor phase current should be measured such that an exact rotor position can be determined in real-time. To implement the determination of the motor phase current, the microcontroller 6 may employ an algorithm (e.g., space vector modulation (SVM), also referred as space vector pulse width modulation (SVPWM)) that uses single-shunt current sensing.

Furthermore, the switches 3 (i.e., transistors) of the power inverter 1 are controlled so that at no time are both switches in the same inverter leg turned on or else the DC supply would be shorted. This requirement may be met by the complementary operation of the switches 3 within an inverter leg according to the motor control algorithm.

Figure 1B:
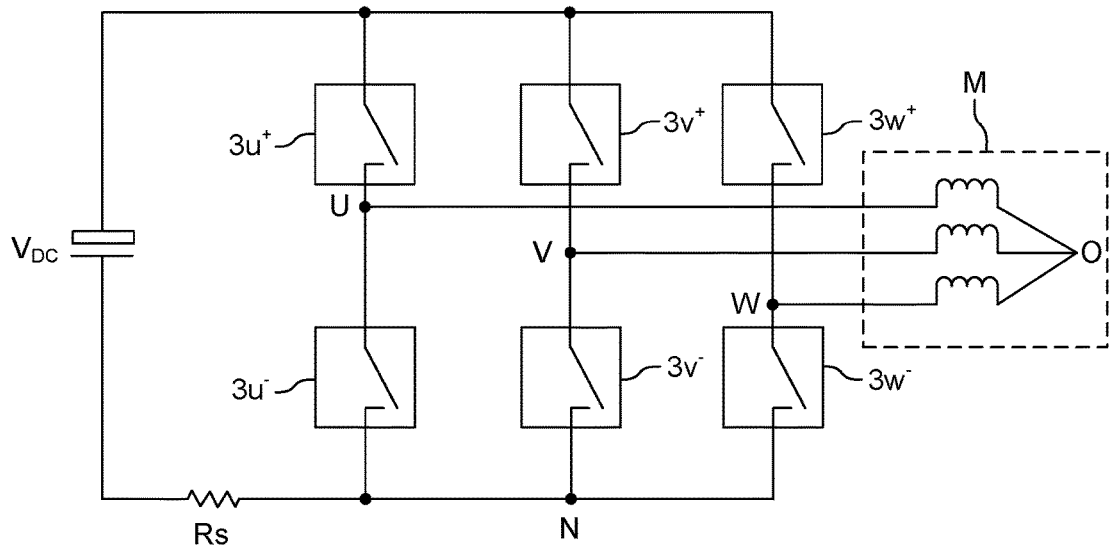
FIG. 1B is a schematic diagram illustrating a power inverter utilizing single-shunt current sensing according to one or more embodiments.

FIG. 1B is a schematic diagram illustrating a power inverter 1 utilizing single-shunt current sensing according to one or more embodiments. In particular, the power inverter 1 includes a shunt resistor Rs placed on the negative DC link of the power inverter 1. The transistors $3_{u+}$, $3_{u-}$, $3_{v+}$, $3_{v-}$, $3_{w+}$, and $3_{w-}$ are represented as switches and the motor M is shown with a winding for each of its phases. Here, UO represents the line to neutral voltage from bridge middle point U to motor neutral point O; UN represents the U bridge voltage from bridge middle point U to the negative bus supply rail N; UV represents the line-to-line voltage from U phase to V phase; VW represents the line-to-line voltage from V phase to W phase; and WV represents the line-to-line voltage from W phase to V phase.

The microcontroller 6 in FIG. 1A may receive samples of the current taken from the shunt resistor Rs and then use an algorithm (i.e., software) to re-construct the three-phase current in real-time. For example, SVPWM is a vector control based algorithm that requires the sensing of the three motor phase currents. By using the single-shunt resistor Rs, DC-link current pulses are sampled at exactly timed intervals. A voltage drop on the shunt resistor Rs may be amplified by an operational amplifier inside inverter control unit 2 and shifted up, for example, by 1.65V. The resultant voltage may be converted by an ADC inside inverter control unit 2. Based on the actual combination of switches, the three-phase currents of the motor M are reconstructed using the SVPWM algorithm. The ADC may measure the DC-link current during the active vectors of the PWM cycle. In each sector, two phase current measurements are available. The calculation of the third phase current value is possible because the three winding currents sum to zero.

SVPWM itself is an algorithm for the control of PWM in real-time. It is used for the creation of AC waveforms, and may be used to drive three-phase AC powered motors at varying speeds from a DC source using multiple switching transistors. While the examples herein are described in the context of three-phase motors, the examples are not limited thereto and may be applied to any load scheme.

In addition, it will be appreciated that other implementations other than a single-shunt resistor may be used for current sensing, as well as other motor control algorithms may be used to control the load, and that the embodiments described herein are not limited thereto.

Figures 1, 2:
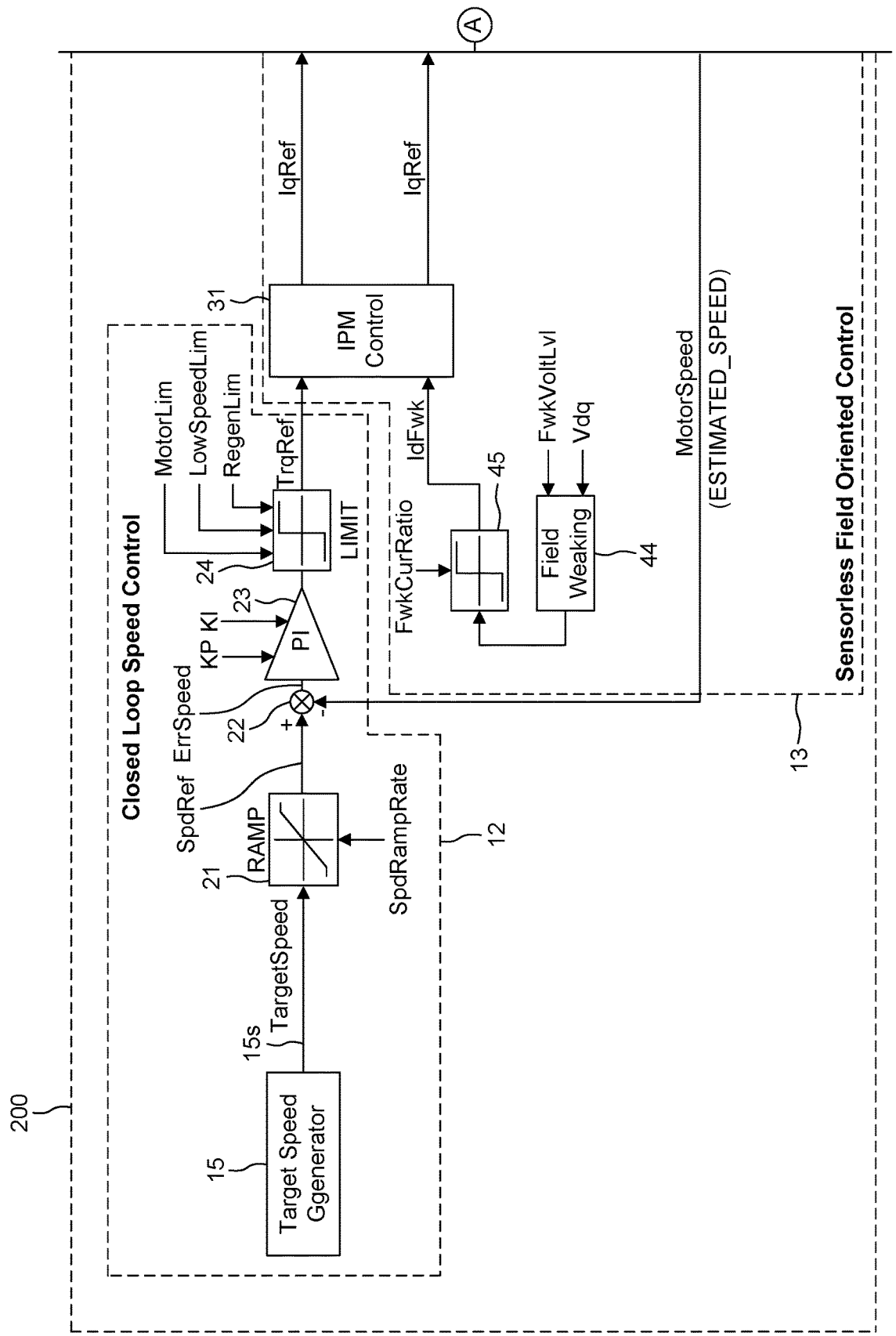
FIGS. 2-1 and 2-2 illustrate a schematic block diagram of a motor control algorithm implemented by a motor controller according to one or more embodiments.
Figure 2:
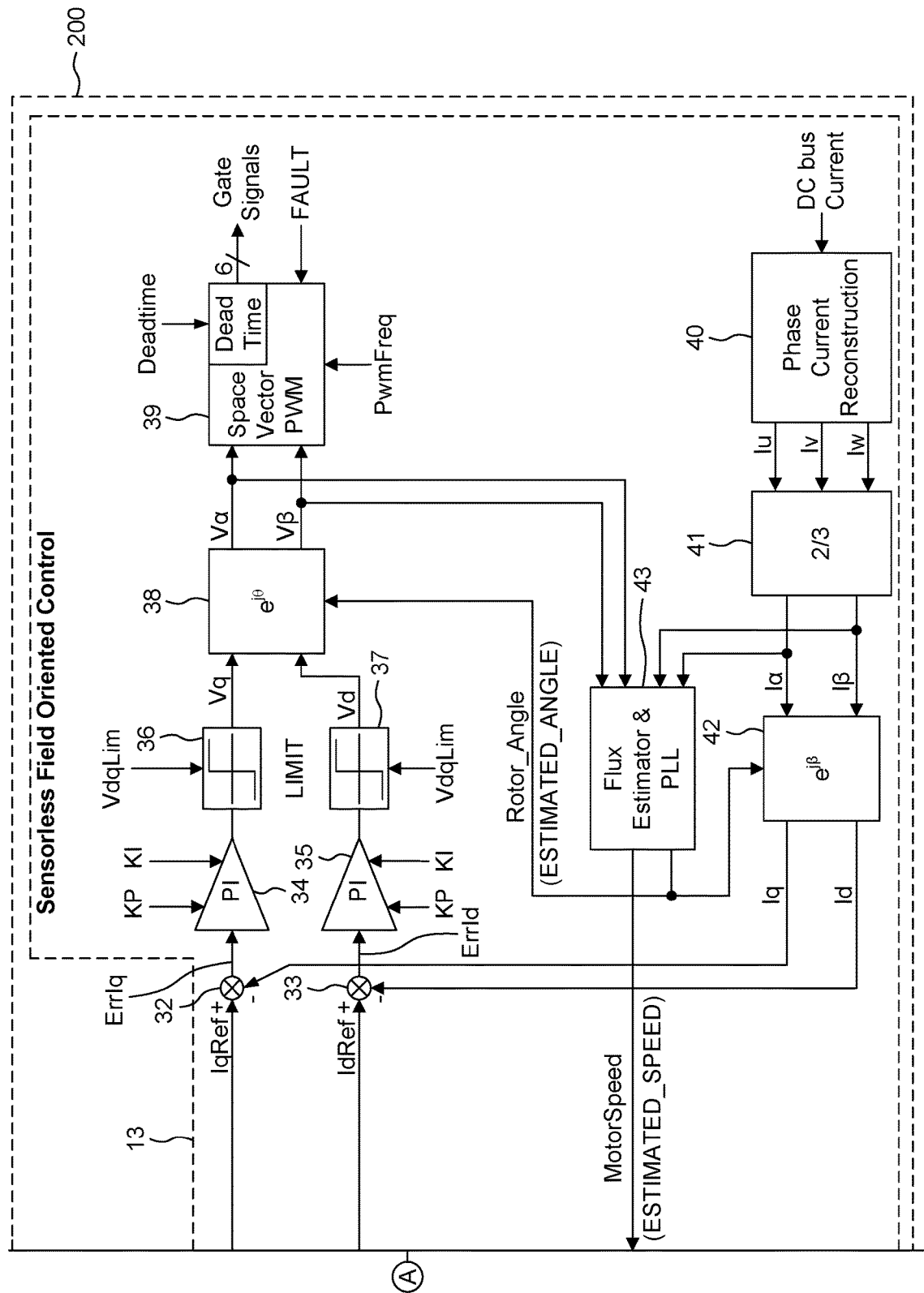

FIGS. 2-1 and 2-2 illustrate a schematic block diagram of a motor control algorithm 200 according to one or more embodiments. In particular, FIG. 2 is comprised of two parts, FIGS. 2-1 and 2-2, that are joined together at a respective boundary (A) to form the full motor control algorithm 200. The motor control algorithm 200 may be implemented as firmware programmed into the motor controller 6 or by a combination of firmware and circuit components. The motor controller 6 itself may include one or more controllers, one or more processing circuits, and/or one or more signal processors that is/are configured to implement the motor control algorithm 200.

In particular, the motor control algorithm 200 includes a speed constant control loop 12, which may be sensor-based or sensorless-based, and a current control loop 13 that are implemented by motor controller 6 shown in FIG. 1A. Thus, the motor controller 6 includes a speed controller that implements outer loop control and a current controller that implements inner loop control. The speed constant control loop 12 may be used interchangeably with the speed controller 12. Similarly, the current control loop 13 may be used interchangeably with the current controller 13.

As used herein, Vq and Vd represent the stator Q and D axis voltages of the motor in a DQ coordinate system, respectively. That is, Vq is the motor voltage component on the Q-axis of a DQ coordinate system and Vd is the motor voltage component on the D-axis of the DQ coordinate system. Similarly, Iq and Id represent the stator Q and D axis currents of the motor in a DQ coordinate system, respectively. That is, Iq is the motor current component on the Q-axis of the DQ coordinate system and Id is the motor current component on the D-axis of the DQ coordinate system. Furthermore, each Proportional-Integral (PI) controller receives a proportional gain KP and an integral gain KI and generates an output according to equations, Eq. 1 and Eq. 2:

$$\text{PI output} = KP\Delta + KI\smallint \Delta dt, \qquad \text{Eq. 1,}$$

where Δ is the error or deviation of an actual measured value (PV) from a setpoint (SP).

$$\Delta = SP - PV \qquad \text{Eq. 2.}$$

FOC software supports to drive both types of Permanent Magnet Synchronous Motors (PMSM), i.e., constant air-gap surface mount magnet motor and interior mount magnet motors with variable-reluctance. A sensorless FOC algorithm structure is illustrated in FIGS. 2-1 and 2-2 and follows a cascaded control structure, with an outer speed constant control loop and an inner current control loop that each play a role at varying the motor windings voltages to drive the motor at a target power or a target speed. A sensor-based FOC algorithm structure may also be used as long as the flux estimator and PLL unit 43 is active. The speed constant control loop receives a target speed Target-Speed from, for example, an external signal generator 15 (e.g., (Universal Asynchronous Receiver/Transmitter (UART), variable-speed pump (VSP), Frequency, and Duty Cycle)). For example, the external signal generator 15 may be configured to generate the external digital or analog signal 15s based on one or more input parameters directed to setting a target speed of the motor, and provide the target speed TargetSpeed of the motor to a speed ramp rate SpdRampRate block 21 of the speed controller 12. It will be appreciated that the target speed TargetSpeed may be provided by another source, such as another controller loop that serves as a further outer control loop, thereby making the speed control loop an intermediate control loop.

The speed controller 12 calculates the motor torque required to follow the target speed (TargetSpeed). TargetSpeed is a variable that sets the target speed of the motor. The target speed is a constant value when it is set; it will be changed to a sloped raising value SpdRef by speed ramp rate SpdRampRate block 21 according to a speed ramp rate. The error generator 22 receives the SpdRef signal and an actual (measured) motor speed value MotorSpeed (i.e., estimated speed) from a flux estimator and phase-locked loop (PLL) unit 43, and generates a speed error ErrSpeed that is the deviation between the SpdRef signal and the actual (estimated) motor speed.

The PI compensator 23 acts on the error ErrSpeed. The integral term forces the speed steady state error to zero while the proportional term improves the high frequency response. The PI compensator gains KP and KI are adjusted depending on the motor and load characteristics to meet the target dynamic performance. The output of PI compensator 23 is torque current TrqRef that can sustain the motor speed SpdRef. The limiting function block 24 applies one or more limiting functions on the output of PI compensator 23. For example, the limiting function block 24 performs a motor limiting function MotorLim on the output of the PI compensator 23 to prevent integral windup and to maintain the motor currents within the motor max current. The limiting function block 24 performs a low speed limiting function LowSpeedLim on the output of the PI compensator 23 to limit the motor current at low speed. The limiting function block 24 performs a regeneration current limiting function RegenLim on the output of the PI compensator 23 to limit the regeneration current of the motor.

The current loops of current controller 13 drive the motor currents needed to generate this torque current TrqRef. The interior permanent magnet (IPM) controller 31 is configured to separate the torque current TrqRef into IdRef and IqRef for interior mount magnet motors with variable-reluctance based on the difference of Ld and Lq. For constant air-gap surface mount magnet (SMM) motors the IqRef equals to TrqRef and IdRef equals to 0. IqRef is a current command (i.e., a reference current value) on the Q-axis. In other words, IqRef is a value of a target current for an Iq current component. Similarly, IdRef is a value of a target current (i.e., a reference current value) for an Id current component. The IPM controller 31 also receives field weakening current IdFwk which is limited by limiting function block 45 based on FwkCurRatio. The flux weakening current IdFwk is calculated by Field Weakening block 44 based on the Vdq (that is the square root of Vd and Vq) and FwkVoltLvl which set the field weakening level. The field weakening current IdFwk will be added to IdRef in IPM controller 31 for all Interior Permanent Magnet Synchronous Motors (IPMSMs) and Surface Permanent Magnet Synchronous Motors (SPMSMs).

The current Iq loop PI compensator 34, also referred to as an Iq controller 34, acts on the error ErrIq between the IqRef and Iq. The integral term forces the steady state error to zero while the proportional term improves the high frequency response. The PI compensator gains KP and KI are adjusted depending on the motor and load characteristics to meet the target dynamic performance. The limiting function block 36 applies one or more limiting functions on the output of the PI compensator 34 to prevent integral windup and to maintain inverter output voltage based on VdqLim.

Similarly, the current Id loop PI compensator 35, also referred to as an Id controller 35, acts on error ErrId between the IdRef and Id. The PI compensator gains KP and KI are also adjusted depending on the motor and load characteristics to meet the target dynamic performance, but generally they are the same as current Iq loop PI compensator 34. The limiting function block 37 applies one or more limiting functions on the output of the PI compensator 35 to prevent integral windup and to maintain invertor output voltage based on VdqLim.

A forward vector rotation unit 38 applies a forward vector rotation to the current loop output voltages Vd and Vq and transforms the current loop output voltages Vd and Vq into two phase AC voltage components Vα and Vβ based on the rotor angle θ calculated by the flux estimator and PLL unit 43. A space vector pulse width modulator 39 receives the two phase AC voltage components Vα and Vβ and generates the inverter switching signals (i.e., six paths of PWM control signals output from motor controller 6) based on the Vα and Vβ voltage inputs and SVPWM. The gate driver 7 then turns on/off the respective power transistors 3 based on the PWM control signals. PwmFreq provides the frequency of the PWM control signals to the space vector pulse width modulator 39. FAULT provides a fault signal to the space vector pulse width modulator 39 in case of a detected fault.

The current loops of current controller 13 calculate the inverter voltages to drive the motor currents needed to generate the desired torque. The phase current reconstruction circuit 40 uses single shunt reconstruction to reconstruct the each of the phase currents Iu, Iv, and Iw for each respective phase U, V, and W. In particular, phase current reconstruction circuit 40 measures the DC link current in the shunt resistor during the active vectors of the PWM cycle. In each PWM cycle, there are two different active vectors and the DC link current in each active vector represents current on one motor phase. The calculation of the third phase current value is possible because at balanced condition the sum of all the three winding currents is zero.

The Field-oriented control (FOC) uses the Clarke transform at Clarke transformation unit 41 to apply an alpha-beta transformation on the three-phase currents to derive an alpha current Iα and a beta current Iβ. The FOC further uses a vector rotation (i.e., a cordic rotation) at vector rotation unit 42 to transform the motor winding currents using alpha and beta currents Iα and Iβ into two quasi DC current components, an Id current component that reinforces or weakens the rotor field and an Iq current component that generates motor torque.

Two error generators (e.g., subtractors) 32 and 33 generate error values ErrIq and ErrId, respectively. In particular, error generator 32 receives the reference current value IqRef as a setpoint (SP) value from the IPM control block 31 and the Iq current value from the vector rotation unit 42 as the actual measured value (PV), and generates error value ErrIq. Similarly, error generator 33 receives a reference current value IdRef (i.e., the reference current value on the D-axis) from the IPM control block 31, as a setpoint (SP) value and the Id current value from the vector rotation unit 42 as the actual measured value (PV), and generates error value ErrId.

Typically, the torque reference current TrqRef from the speed controller is separated to Iqref and Idref according to the difference of motor inductance Ld, Lq by IPM Control block 31. Iqref and Idref represent target currents. Normally, IdRef is zero for a SMM motor or a negative value scaling to torque current TrqRef for an IPM motor. However, above a certain speed, known as the base speed, the inverter output voltage becomes limited by the DC bus voltage. In this situation, the field weakening controller 44 generates a negative Id plus the Id separated from the torque reference current to oppose the rotor magnet field that reduces the winding back electromotive force (EMF). This enables operation at higher speeds but at a lower torque output. The Field Weakening block 44 is to adjust the Id current to maintain the motor voltage magnitude within the bus voltage limit.

A rotor magnet position estimator includes a flux estimator and PLL 43. The flux estimator and the flux PLL are running in order to detect the rotor position and measure the motor speed of a running motor. Flux is calculated based on feedback current (i.e., using alpha and beta currents Iα and Iβ, estimated voltages Vα and Vβ (based on DC bus feedback voltage and a modulation index), and motor parameters (inductance and resistance) as provided in equations 3 and 4 below. The output of the flux estimator 51 represents rotor magnet fluxes in Alpha-Beta (stationary orthogonal frame, u-phase aligned with Alpha) two-phase quantities.

The angle and frequency phase-locked loop (PLL) 55 of the flux estimator and PLL 43 estimates the flux angle (i.e., estimated rotor angle θ) and motor speed from the rotor magnet flux vector in Alpha-Beta components. A vector rotation 53 of the PLL calculates the error between the rotor flux angle and the estimated angle. A PI compensator of the PLL 55 in the closed loop path forces the angle and frequency estimates to track the angle and frequency of the rotor flux. The motor speed is derived from the rotor frequency according to the number of rotor poles.

When driving an interior permanent magnet (IPM) motor the rotor saliency can generate a reluctance torque component to augment the torque produced by the rotor magnet. When driving a surface magnet motor (SMM), there is zero saliency (Ld=Lq) and Id is set to zero for maximum efficiency. In the case of an IPM motor which has saliency (Ld<Lq) a negative Id will produce positive reluctance torque. The most efficient operating point is when the total torque is maximized for a given current magnitude. The most efficient operating point of both surface magnet motors (SMM) and interior permanent magnet (IPM) motors is calculated by IPM Control block 31.

It will be appreciated that the speed constant controller 12 and the current controller 13 as shown merely illustrated one example configuration and are not limited thereto. For example, in general, the speed constant controller 12 is configured with a speed control loop that outputs the torque current TrqRef based on target speed TargetSpeed. In addition, the current controller 13 is configured to calculate voltage and current information used for driving the motor based on the torque current TrqRef output from the speed constant controller 12. In particular, the current controller 13 determines the stator Q-axis and D-axis voltages Vd and Vq, as well as the stator Q-axis and D-axis currents Iq and Id.

In a catch spin method, the controller may track the back EMF in order to determine if the motor is turning, and if so, in which direction. The conventional catch spin sequence begins after the bootstrap capacitor charging stage is completed. During the catch spin, both IqRef and IdRef are set to 0 (Speed regulator is disabled), meanwhile the flux PLL attempts to lock to the actual motor speed (MotorSpeed) and rotor angle (RotorAngle). A catch spin time is defined by a TCatchSpin parameter. Once the catch spin time is elapsed, the calculated motor speed is checked with a "DirectStartThr" parameter value. If the motor speed is more than or equal to the "DirectStartThr" parameter value, normal speed control starts, current motor speed will become the initial speed reference and is also set as the speed ramp starting point. Depending on the set target speed, the motor will decelerate (via regenerative braking) or accelerate to reach the desired speed. If the motor speed is less than the "DirectStartThr" parameter value, the motor state changes to an "ANGLESENSING" state.

During a forward catch spin sequence where the motor is spinning in the same direction as desired, no motor current is injected. After the catch spin time TCatchSpin has elapsed, assuming the flux PLL of block 43 locks to the actual motor speed, the motor speed at that instance becomes the initial speed reference and the starting point for the speed ramp reference SpdRef used by the speed ramp rate SpdRampRate block 21. The motor continues to accelerate or decelerate, following the speed ramp reference SpdRef to reach the set target speed TargetSpeed.

During a reverse catch spin sequence where the motor is spinning in the opposite direction as desired, no motor current is injected. After the TCatchSpin time has elapsed, the motor is still spinning in an opposite direction at a speed higher than a Regen Speed Threshold (RegenSpdThr). Thus, an injected torque, limited by the value defined in the RegenLim parameter, forces the motor to decelerate via regenerative braking. Once the speed of the reverse spinning motor falls below the Regen Speed Threshold (RegenSpdThr), the injected torque is limited by MotorLim (RegenLim≤MotorLim). The injected torque forces the motor to come to a stop and start accelerating in the desired spin direction, following the speed ramp reference SpdRef to reach the set target speed TargetSpeed.

The described embodiments use a flux estimator 51 and a flux amplitude and angle extraction block 55 which can be, for example, implemented by a PLL. The flux estimator and PLL unit 43 continuously monitors the permanent magnetic flux linkage throughout the entire lifetime duration of a PMSM drive system in order to detect the occurrence of demagnetization of the permanent magnet of the motor's rotor.

Figure 3:
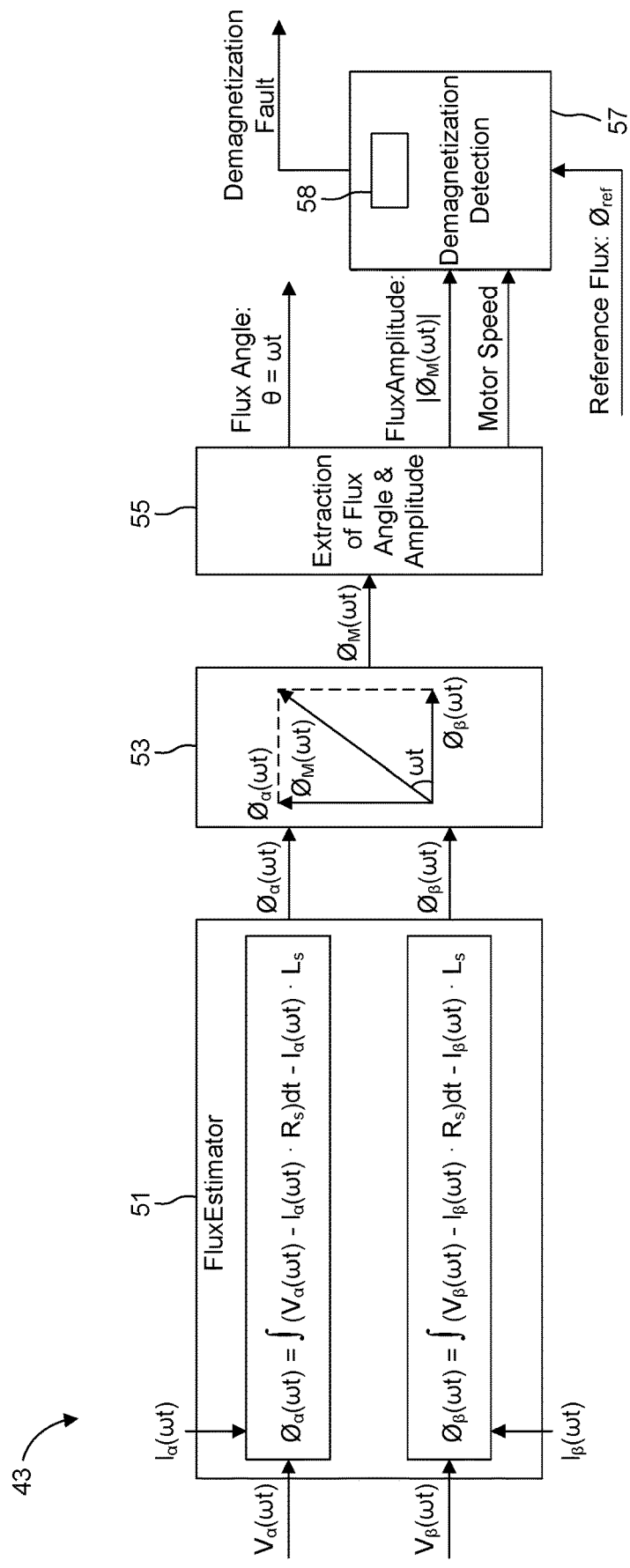
FIG. 3 is a schematic diagram of a flux estimator and a flux phase-locked loop (PLL) of the motor control algorithm implemented by the motor controller according to one or more embodiments.

FIG. 3 is a schematic diagram of a flux estimator, a flux PLL, and a demagnetization detector of the flux estimator and PLL unit 43 according to one or more embodiments. The rotor magnetic flux linkage ($Ø_M(\omega t)$) is estimated via the flux estimator 51 followed by flux magnitude and angle extraction performed by the PLL 35.

The flux estimator 51 is configured to receive the two phase AC voltage components Vα and Vβ from the forward vector rotation unit 38 and to receive the alpha current Iα and the beta current Iβ from the Clarke transformation unit 41 in order to perform a non-ideal integration of the motor back EMF. In particular, rotor magnetic fluxes in Alpha-Beta 2-phase quantities (stationary orthogonal frame) are obtained by the flux estimator 51 by non-ideal integration of motor back EMF which is calculated by using the corresponding motor phase current Iα or Iβ, the corresponding stator voltage Vα or Vβ, the motor winding resistance $R_s$, and the motor winding inductance $L_s$ as shown in the following equations, Eq. 3 and Eq. 4:

$$\phi_\alpha(\omega t) = \int (V_\alpha(\omega t) - I_\alpha(\omega t) \cdot R_s) dt - I_\alpha(\omega t) \cdot L_s; \quad \text{Eq. 3}$$

$$\phi_\beta(\omega t) = \int (V_\beta(\omega t) - I_\beta(\omega t) \cdot R_s) dt - I_\beta(\omega t) \cdot L_s, \quad \text{Eq. 4}$$

where $\emptyset_\alpha(\omega t)$ represents the alpha rotor magnetic flux and $\emptyset_\beta(\omega t)$ represents the beta rotor magnetic flux.

These two stationary components of the rotor magnetic flux $\emptyset_\alpha(\omega t)$ and $\emptyset_\beta(\omega t)$ are provided to the vector rotator 53 that is configured to generate D and Q components in a rotationary frame of a DQ coordinate system. The D rotor magnetic flux component represents the amplitude of the rotor magnetic flux. The Q rotor magnetic flux component represents the error between the rotor flux angle α and the estimated angle θ.

The rotor magnet flux linkage $\emptyset_M(\omega t)$ is derived by the vector rotator 53 according to the following equation, Eq. 5:

$$\emptyset_M(\omega t) = \sqrt{\emptyset_\alpha(\omega t)^2 + \emptyset_\beta(\omega t)^2} \quad \text{Eq. 5}$$

In particular, the vector rotator calculation performed by the vector rotator 53 is as follows:

$D = \emptyset_\alpha * \cos(\theta) + \emptyset_\beta * \sin(\theta),$ $Q = \emptyset_\beta * \cos(\theta) - \emptyset_\alpha * \sin(\theta),$ Since, $\emptyset_\alpha = \emptyset_M * \cos(\alpha)$ and $\emptyset_\beta = \emptyset_M * \sin(\alpha)$,
The following is true:

$D = \emptyset_M * \cos(\alpha) * \cos(\theta) + \emptyset_M * \sin(\alpha) * \sin(\theta),$ $Q = \emptyset_M * \sin(\alpha) * \cos(\theta) - \emptyset_M * \cos(\alpha) * \sin(\theta),$ When α=θ, the following is true:

$D = \emptyset_M * (\cos(\theta)^2 + \sin(\theta)^2) = \emptyset_M,$ $Q = \emptyset_M * (\sin(\theta) * \cos(\theta) - \cos(\theta) * \sin(\theta)) = 0.$ As noted above, the D rotor magnetic flux component (i.e., D in the vector rotator calculation) represents the amplitude $\emptyset_M$ of the rotor magnetic flux. The Q rotor magnetic flux component (i.e., Q in the vector rotator calculation) represents the error between the rotor flux angle α and the estimated rotor angle θ.

Alternatively, the rotor magnet flux linkage $\emptyset_M(\omega t)$ may be calculated by the flux estimator 51 by applying Equation 5 or the vector rotator 53 may be incorporated by the flux estimator 51.

The rotor magnet flux linkage $\emptyset_M(\omega t)$ is a dynamically varying sinusoidal variable containing the phase and angle information ωt of the rotor magnet flux linkage and the magnitude information $|\emptyset_M(\omega t)|$ of the rotor magnet flux linkage. Extraction of the angle and the magnitude of the rotor magnet flux linkage from the rotor magnet flux linkage $\emptyset_M(\omega t)$ can be implemented by PLL 55, for example. The extracted (i.e., estimated) flux linkage magnitude represents the permanent magnet strength at a given time of the motor operation since its self-inductance (Ls) related flux component is excluded. Thereby, when a motor flux strength changes by degradation over the time of usage, its magnitude also proportionally changes (i.e., decreases) reflecting the degradation without influence of self-inductance. Thus, the system can identify and detect the amount of demagnetization of a permanent magnet motor by continuously monitoring the estimated flux linkage magnitude.

In particular, the flux linkage magnitude $|\emptyset_M(\omega t)|$ is provided from the PLL 55 to the demagnetization detector 57 for evaluation. The demagnetization detector 57 is configured to also receive and store a reference flux magnitude Øref and compare the flux linkage magnitude $|\emptyset_M(\omega t)|$ to a predefined demagnetization level $\text{Demag}_{Thresh}$ that is based on the reference flux magnitude Øref. In particular, the predefined demagnetization level $\text{Demag}_{Thresh}$ is a predefined percentage (Demag Level %) or fraction of the reference flux magnitude Øref according to the following equation, Eq. 6:

$$\text{Demag}_{Thresh} = \emptyset\text{ref} * \text{Demag Level \%} \quad \text{Eq. 6.}$$

The predefined demagnetization level $\text{Demag}_{Thresh}$ is established to be less than the reference flux magnitude Øref (e.g., by at least 10% less) and represents a threshold value to which the measured flux linkage magnitude $|\emptyset_M(\omega t)|$ is compared for demagnetization monitoring and detection. While the Demag Level % is not limited to be 90% or less, some margin should be used from the reference flux magnitude Øref in order to allow small variations in measured flux linkage magnitude and to safely prevent detecting a false demagnetization.

The demagnetization detector 57 may, for example, determine that no demagnetization fault exists on a condition that the flux linkage magnitude $|\emptyset_M(\omega t)|$ is greater than the predefined demagnetization level $\text{Demag}_{Thresh}$. In this case, no fault signal is generated or an OK signal is generated by the demagnetization detector 57.

On the other hand, the demagnetization detector 57 may determine that a demagnetization fault exists on a condition that the flux linkage magnitude $|\emptyset_M(\omega t)|$ is equal to or less than the predefined demagnetization level $\text{Demag}_{Thresh}$. In this case, the demagnetization detector 57 may generate a demagnetization fault signal that indicates that demagnetization of the rotor permanent magnet has occurred.

Additionally, a timing threshold may also be considered in the demagnetization monitoring and detection. For example, not only may the demagnetization detector 57 compare the flux linkage magnitude $|\emptyset_M(\omega t)|$ to the predefined demagnetization level $\text{Demag}_{Thresh}$, but the demagnetization detector 57 may also monitor an amount of time the flux linkage magnitude $|\emptyset_M(\omega t)|$ is equal to or less than the predefined demagnetization level $\text{Demag}_{Thresh}$ via a counter or other means, and can compare the measured time to a predefined timing threshold. Demagnetization of the rotor permanent magnet may be detected on the condition that the measured time equals or exceeds the predefined timing threshold. This timing condition may further assist in tolerating variations in measured flux linkage magnitude for small durations without triggering the demagnetization fault signal. Consequently, a false demagnetization detection may be prevented.

As a result, the demagnetization detector 57 may apply a two-tiered conditional analysis, where it monitors for a first condition to be satisfied (i.e., the flux linkage magnitude $|\emptyset_M(\omega t)|$ is equal to or less than the predefined demagnetization level $\text{Demag}_{Thresh}$), and once the first condition is satisfied, the demagnetization detector 57 monitors for a second condition to be satisfied (i.e., the duration at which the flux linkage magnitude $|\emptyset_M(\omega t)|$ is equal to or less than the predefined demagnetization level $\text{Demag}_{Thresh}$ meets or exceeds a predefined timing threshold). If second condition is satisfied, the demagnetization detector 57 generates the demagnetization fault signal. On the other hand, if the flux linkage magnitude $|\emptyset_M(\omega t)|$ exceeds the predefined demagnetization level $\text{Demag}_{Thresh}$ during the monitoring of the second condition prior to meeting predefined timing threshold, then the demagnetization detector 57 does not generate the demagnetization fault signal and resets back to monitoring for the first condition.

As a result, the rotor magnetic flux linkage ($Ø_M(\omega t)$) is continuously estimated via the flux estimator 51 and the vector rotator 53 during operation (i.e., during rotation) of the motor M and throughout the entire lifetime duration the PMSM drive system. In turn, the demagnetization detector 57 is configured to continuously monitor for the occurrence of demagnetization of the rotor permanent magnet during operation of the motor M and throughout the entire lifetime duration the PMSM drive system.

In addition, the demagnetization detector 57 includes a memory device 58, such as a flight recorder, that is configured to periodically store the value of the estimated flux linkage magnitude ($Ø_M$) when the flux estimator 51 and flux PLL 55 are locked and in a steady state.

Initially, the flux linkage magnitude ($Ø_M$) may be estimated at a zero hour service time during which the motor M is operated under a predefined load and the flux linkage magnitude ($Ø_M$) is measured. In other words, the zero hour service time is a test period during which the motor is tested and its characteristics can be measured to, for example, develop a system model for one or more aspects of the motor control algorithm. The initial flux linkage magnitude ($Ø_M$) determined during this test period may be stored in the memory device 58 and set as the reference flux magnitude Øref to be used in the demagnetization detection during the remaining lifetime of the motor control system in the manner described above.

If the actual flux linkage magnitude ($Ø_M$) that is measured during an operation phase of the motor M is detected to be lower than a predefined demagnetization level for a configurable amount of time, then a demagnetization fault is triggered by the demagnetization detector 57. One advantage of this concept is that the rotor magnetic flux linkage estimation does not require any additional dedicated calculation. Instead, it is obtained from the same flux estimator and PLL unit 43 that is used for estimating the rotor speed and rotor angle. In addition, the rotor magnetic flux linkage estimation method is not affected by the motor loading conditions and motor speed.

One limitation of the rotor magnetic flux linkage estimation method is that there exists a minimum motor speed at which the flux estimator 51 can work effectively such that the measured flux linkage magnitude ($Ø_M$) is not reliable if the motor speed is less than the minimum motor speed. This minimum speed limit is necessary to avoid saturating the integrator used in the flux estimator 51. A cutoff frequency $\omega_b$ of the non-ideal integrator of the flux estimator 51 is provided by the following equation, Eq. 7:

$$\omega_b = 1/\tau_{Flx} \quad \text{Eq. 7,}$$

where $\tau_{Flx}$ is the flux estimator time constant of the flux estimator 51. When the motor speed is less than the cutoff frequency $\omega_b$ of the non-ideal integrator, the gain of the non-ideal integrator is flattened and no longer keeps increasing. Thus, the estimated rotor magnetic flux linkage ($Ø_M$) is no longer accurate if the rotor fundamental frequency $\omega_r$, represented by equation 8 (Eq. 8) is lower than the cutoff frequency $\omega_b$ of the non-ideal integrator. Equation 8 is provided as follows:

$$\omega_r = \frac{\text{rotor speed(rpm)}}{60} \times \frac{\text{number of rotor poles}}{2}. \quad \text{Eq. 8}$$

Typically, this minimum motor speed limit is around 5% of the maximum rated motor speed. Thus, the memory device 58 may store a minimum motor speed limit and this minimum motor speed limit may be based on a predetermined percentage or fraction of the maximum rated motor speed of the motor M. In this case, the demagnetization detector 57 is configured to receive the measured (estimated) motor speed (MotorSpeed) from the flux PLL 55 and compare the estimated measured motor speed to the minimum motor speed limit stored in the memory device 58. On a condition that the estimated measured motor speed is equal to or greater than the minimum motor speed limit, the demagnetization detection monitoring of the demagnetization detector 57 is enabled. For example, the demagnetization detection monitoring may itself be initialized and activated such that the rotor magnet flux linkage estimated value ($Ø_M$) is considered in the determination of the demagnetization fault. On the other hand, on a condition that the estimated measured motor speed is less than the minimum motor speed limit, the demagnetization detection monitoring of the demagnetization detector 57 is disabled. For example, the demagnetization detector 57 may ignore or disregard any rotor magnet flux linkage estimated value ($Ø_M$) that is received from the PLL 55 while the estimated measured motor speed is less than the minimum motor speed limit. As a consequence, no demagnetization faults are generated or output by the demagnetization detector 57 while the estimated measured motor speed is less than the minimum motor speed limit.

In view of the above, a digital motor control system for home appliance applications including, but not limited to, air-conditioning units, fan controls, refrigerators, washing machines, air-purifiers, vacuum cleaners, hairdryers, pumps, and the like is configured to accurately estimate the rotor magnet flux linkage using the flux equations 3, 4, and 5, and detect a demagnetization of the permanent magnet of a rotor based on the estimated rotor magnet flux linkage.

While various embodiments have been described, it will be apparent to those of ordinary skill in the art that many more embodiments and implementations are possible within the scope of the disclosure. For example, while certain embodiments may be directed to sensorless FOC, the embodiments may also use sensor-based FOC as long as the flux estimator and PLL unit 43 is active. Accordingly, the invention is not to be restricted except in light of the attached claims and their equivalents. With regard to the various functions performed by the components or structures described above (assemblies, devices, circuits, systems, etc.), the terms (including a reference to a "means") used to describe such components are intended to correspond, unless otherwise indicated, to any component or structure that performs the specified function of the described component (i.e., that is functionally equivalent), even if not structurally equivalent to the disclosed structure that performs the function in the exemplary implementations of the invention illustrated herein.

Furthermore, the following claims are hereby incorporated into the detailed description, where each claim may stand on its own as a separate example embodiment. While each claim may stand on its own as a separate example embodiment, it is to be noted that—although a dependent claim may refer in the claims to a specific combination with one or more other claims—other example embodiments may also include a combination of the dependent claim with the subject matter of each other dependent or independent claim. Such combinations are proposed herein unless it is stated that a specific combination is not intended. Furthermore, it is intended to include also features of a claim to any other independent claim even if this claim is not directly made dependent to the independent claim.

It is further to be noted that methods disclosed in the specification or in the claims may be implemented by a device having means for performing each of the respective acts of these methods.

Further, it is to be understood that the disclosure of multiple acts or functions disclosed in the specification or in the claims may not be construed as to be within the specific order. Therefore, the disclosure of multiple acts or functions will not limit these to a particular order unless such acts or functions are not interchangeable for technical reasons. Furthermore, in some embodiments a single act may include or may be broken into multiple sub acts. Such sub acts may be included and part of the disclosure of this single act unless explicitly excluded.

Depending on certain implementation requirements, embodiments provided herein can be implemented in hardware or in software. The implementation can be performed using a digital storage medium, for example a floppy disk, a DVD, a Blue-Ray, a CD, a RAM, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Instructions may be executed by one or more processors, such as one or more central processing units (CPU), digital signal processors (DSPs), general purpose microprocessors, application specific integrated circuits (ASICs), field programmable logic arrays (FPGAs), or other equivalent integrated or discrete logic circuitry. Accordingly, the term "processor," as used herein refers to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

Thus, the techniques described in this disclosure may be implemented, at least in part, in hardware, software, firmware, or any combination thereof. For example, various aspects of the described techniques may be implemented within one or more processors, including one or more microprocessors, DSPs, ASICs, or any other equivalent integrated or discrete logic circuitry, as well as any combinations of such components.

A control unit including hardware may also perform one or more of the techniques described in this disclosure. Such hardware, software, and firmware may be implemented within the same device or within separate devices to support the various techniques described in this disclosure. Software may be stored on a non-transitory computer-readable medium such that the non-transitory computer readable medium includes a program code or a program algorithm stored thereon which, when executed, causes a computer program to perform the steps of a method.

Although various exemplary embodiments have been disclosed, it will be apparent to those skilled in the art that various changes and modifications can be made which will achieve some of the advantages of the concepts disclosed herein without departing from the spirit and scope of the invention. It will be obvious to those reasonably skilled in the art that other components performing the same functions may be suitably substituted. It is to be understood that other embodiments may be utilized and structural or logical changes may be made without departing from the scope of the present invention. It should be mentioned that features explained with reference to a specific figure may be combined with features of other figures, even in those not explicitly mentioned. Such modifications to the general inventive concept are intended to be covered by the appended claims and their legal equivalents.

What is claimed is:

1. A motor controller configured to drive a permanent magnet synchronous motor (PMSM), the motor controller comprising:
   a current controller configured to generate control signals for driving the PMSM, wherein the current controller is configured to measure voltage information of the PMSM and current information of the PMSM;
   a flux estimator configured to receive the voltage information and the current information and calculate a rotor magnetic flux linkage based on the voltage information and the current information;
   an extraction circuit configured to receive the rotor magnetic flux linkage and extract a flux linkage magnitude of the rotor magnetic flux linkage from the received rotor magnetic flux linkage; and
   a demagnetization detector configured to continuously monitor for a demagnetization of a rotor permanent magnet of the PMSM during operation of the PMSM based on the flux linkage magnitude, wherein the demagnetization detector is configured to compare the flux linkage magnitude to a predefined demagnetization level and detect the demagnetization on a first condition that the flux linkage magnitude is equal to or less than the predefined demagnetization level.

2. The motor controller of claim 1, wherein the flux estimator is configured to calculate the rotor magnetic flux linkage by:
   calculating two-phase rotor magnetic fluxes based on the voltage information and the current information, wherein the two-phase rotor magnetic fluxes include a first rotor magnetic flux component and a second rotor magnetic flux component, and calculating the rotor magnetic flux linkage based on the first rotor magnetic flux component and the second rotor magnetic flux component.

3. The motor controller of claim 2, wherein the flux estimator is configured to calculate a first back electro motive force (BEMF) of the PMSM and a second BEMF of the PMSM based on the voltage information and the current information, integrate the first BEMF via a non-ideal integration to generate the first rotor magnetic flux component, and integrate the second BEMF via the non-ideal integration to generate the second rotor magnetic flux component.

4. The motor controller of claim 2, wherein the first rotor magnetic flux component is an alpha rotor magnetic flux component of an alpha-beta two-phase quantity and the second rotor magnetic flux component is a beta rotor magnetic flux component of the alpha-beta two-phase quantity.

5. The motor controller of claim 1, wherein:
   the voltage information includes a first phase alternating current (AC) voltage component of a two-phase stator voltage and a second phase AC voltage component of the two-phase stator voltage, and
   the current information includes a first motor phase current component of a two-phase AC current and second motor phase current component of the two-phase balance AC current.

6. The motor controller of claim 5, wherein:
the first phase AC voltage component is an alpha voltage component and the second phase AC voltage component is a beta voltage component, and
the first motor phase current component is an alpha current component and the second motor phase current component is a beta current component.

7. The motor controller of claim 1, wherein the extraction circuit is a phase-locked loop (PLL).

8. The motor controller of claim 1, wherein the rotor magnetic flux linkage is a dynamically varying sinusoidal variable containing phase and angle information and magnitude information representative of the flux linkage magnitude.

9. The motor controller of claim 1, wherein the flux linkage magnitude is representative of a permanent magnet strength of the rotor permanent magnet during PMSM operation.

10. The motor controller of claim 1, wherein, based on the first condition being satisfied, the demagnetization detector is configured to monitor a duration that the flux linkage magnitude remains equal to or less than the predefined demagnetization level, compare the monitored duration to a timing threshold, and detect the demagnetization on a second condition that the monitored duration is equal to or exceeds the timing threshold.

11. The motor controller of claim 10, wherein the demagnetization detector is configured to return to monitoring for the first condition based on the second condition not being satisfied.

12. The motor controller of claim 11, wherein the demagnetization detector is configured to determine that the second condition is not satisfied on a third condition that the flux linkage magnitude becomes greater than the predefined demagnetization level prior to the monitored duration meeting the timing threshold.

13. The motor controller of claim 1, wherein the demagnetization detector is configured to generate and output a demagnetization fault signal in response to detecting the demagnetization.

14. The motor controller of claim 1, wherein the demagnetization detector is configured to store a reference rotor magnetic flux linkage and the predefined demagnetization level is less than the reference rotor magnetic flux linkage by a predefined amount.

15. The motor controller of claim 1, wherein:
the extraction circuit is configured to calculate a motor speed of the PMSM based on the rotor magnetic flux linkage, and
the demagnetization detector is configured to compare the motor speed with a minimum motor speed threshold, enable monitoring for the demagnetization on a condition that the motor speed is equal to or greater than the minimum motor speed threshold, and disable the monitoring for the demagnetization on a condition that the motor speed is less than the minimum motor speed threshold.

16. The motor controller of claim 15, wherein the minimum motor speed threshold is less than a maximum rated speed of the PMSM by a predefined amount.

17. A method of monitoring for a demagnetization of a rotor permanent magnet of a permanent magnet synchronous motor (PMSM) during operation of the PMSM, the method comprising:
generating, by a current controller, control signals for driving the PMSM;
measuring, by the current controller, voltage information of the PMSM and current information of the PMSM;
calculating, by a flux estimator, a rotor magnetic flux linkage based on the voltage information and the current information;
extracting, by an extraction circuit, a flux linkage magnitude of the rotor magnetic flux linkage from the rotor magnetic flux linkage; and
continuously monitoring for the demagnetization, by a demagnetization detector, based on the flux linkage magnitude, wherein continuously monitoring includes comparing the flux linkage magnitude to a predefined demagnetization level and detecting the demagnetization on a first condition that the flux linkage magnitude is equal to or less than the predefined demagnetization level.

18. The method of claim 17, wherein continuously monitoring for the demagnetization further comprises:
based on the first condition being satisfied, monitoring a duration that the flux linkage magnitude remains equal to or less than the predefined demagnetization level, comparing the monitored duration to a timing threshold, and detecting the demagnetization on a second condition that the monitored duration is equal to or exceeds the timing threshold.

19. The method of claim 18, wherein continuously monitoring for the demagnetization further comprises:
returning to monitoring for the first condition based on the second condition not being satisfied.

20. The method of claim 17, further comprising:
generating, by the demagnetization detector, a demagnetization fault signal in response to detecting the demagnetization; and
outputting, by the demagnetization detector, the demagnetization fault signal.

21. The method of claim 17, further comprising:
calculating, by the extraction circuit, a motor speed of the PMSM based on the rotor magnetic flux linkage;
comparing, by the demagnetization detector, the motor speed with a minimum motor speed threshold;
enabling monitoring for the demagnetization, by the demagnetization detector, on a condition that the motor speed is equal to or greater than the minimum motor speed threshold; and
disable the monitoring for the demagnetization, by the demagnetization detector, on a condition that the motor speed is less than the minimum motor speed threshold.

* * * * *